(12) United States Patent
Whittaker

(10) Patent No.: US 8,965,456 B2
(45) Date of Patent: Feb. 24, 2015

(54) BASESTATION MEASUREMENTS

(75) Inventor: Stephen Whittaker, Berkshire (GB)

(73) Assignee: Ubiquisys Limited, Swindon (GB)

( * ) Notice: Subject to any disclaimer, the term of this patent is extended or adjusted under 35 U.S.C. 154(b) by 0 days.

(21) Appl. No.: 13/056,965

(22) PCT Filed: Sep. 21, 2009

(86) PCT No.: PCT/GB2009/051224
§ 371 (c)(1),
(2), (4) Date: Mar. 11, 2011

(87) PCT Pub. No.: WO2010/035024
PCT Pub. Date: Apr. 1, 2010

(65) Prior Publication Data
US 2011/0159926 A1    Jun. 30, 2011

(30) Foreign Application Priority Data

Sep. 23, 2008 (GB) .................................. 0817440.1

(51) Int. Cl.
*H04W 36/00* (2009.01)
*H04W 4/00* (2009.01)
(Continued)

(52) U.S. Cl.
CPC ............ *H04W 88/10* (2013.01); *H04W 84/005* (2013.01); *H04W 52/40* (2013.01);
(Continued)

(58) Field of Classification Search
CPC ... H04W 88/10; H04W 84/005; H04W 52/40; H04W 36/0061; H04W 36/0066; H04W 36/0083; H04W 36/14; H04W 64/003
USPC ........... 455/336–338, 444, 525, 561; 370/331
See application file for complete search history.

(56) References Cited

U.S. PATENT DOCUMENTS 5,553,056 A * 9/1996 Bronte et al. ................. 370/253
6,748,229 B1 * 6/2004 Calatrava-Requena et al. ............................ 455/466

(Continued)

FOREIGN PATENT DOCUMENTS

| CN | 1434595 A | 8/2003 |
|---|---|---|
| EP | 1655908 | 5/2006 |

(Continued)

OTHER PUBLICATIONS

PCT International Search Report and Written Opinion dated Jun. 22, 2010 issued in PCT/GB2009/051224.

(Continued)

*Primary Examiner* — Nizar Sivji
(74) *Attorney, Agent, or Firm* — Weaver Austin Villeneuve & Sampson LLP

(57) ABSTRACT

A basestation, for use in a cellular communications network, is adapted to provide a cellular communications service in at least one active cellular communications network by transmitting signals on system downlink channels of the active network and by receiving signals on system uplink channels of the active network. The basestation is also adapted to receive signals on system downlink channels of the active network. Further, the basestation is adapted to receive signals on system downlink channels of at least one additional network, although it is unable to transmit signals on system downlink channels of the additional network. The additional network may operate in accordance with a different cellular standard from the active network, and/or may be operated by a different cellular network operator from the active network. For example, where the active cellular communications network is a UMTS network, the additional network may be a GSM network, such that said basestation is adapted to receive signals on system downlink channels of the GSM network and is unable to transmit signals on system downlink channels of the GSM network.

20 Claims, 3 Drawing Sheets

(51) Int. Cl.
  *H04W 88/10* (2009.01)
  *H04W 36/14* (2009.01)
  *H04W 84/00* (2009.01)
  *H04W 52/40* (2009.01)
  *H04W 64/00* (2009.01)

(52) U.S. Cl.
  CPC ....... *H04W36/0061* (2013.01); *H04W 36/0066* (2013.01); *H04W 36/0083* (2013.01); *H04W 36/14* (2013.01); *H04W 64/003* (2013.01)
  USPC .......................... 455/561; 455/436; 370/331

(56) References Cited

U.S. PATENT DOCUMENTS

| | | | | |
|---|---|---|---|---|
| 2002/0027982 | A1* | 3/2002 | Plunkett et al. | 379/221.02 |
| 2002/0151308 | A1 | 10/2002 | Baba et al. | |
| 2005/0153743 | A1* | 7/2005 | Berra et al. | 455/560 |
| 2007/0097938 | A1 | 5/2007 | Nylander et al. | |
| 2007/0218862 | A1* | 9/2007 | Tatman et al. | 455/403 |
| 2008/0139197 | A1* | 6/2008 | Misra et al. | 455/423 |
| 2008/0146154 | A1* | 6/2008 | Claussen et al. | 455/63.1 |
| 2009/0047947 | A1* | 2/2009 | Giaretta et al. | 455/432.1 |
| 2010/0067482 | A1* | 3/2010 | Vikberg et al. | 370/331 |
| 2010/0157938 | A1* | 6/2010 | Jin et al. | 370/331 |

FOREIGN PATENT DOCUMENTS

| | | |
|---|---|---|
| GB | 2446196 | 8/2008 |
| WO | WO 2005/011134 | 2/2005 |
| WO | WO 2007/015066 | 2/2007 |
| WO | WO 2008/051124 | 5/2008 |
| WO | WO2008/093104 A2 | 8/2008 |

OTHER PUBLICATIONS

UK Intellectual Property Office Search Report dated Dec. 11, 2008 issued in GB0817440.1.
CN Office Action dated Apr. 28, 2013 for CN Application No. 200980134600.4.
CN Office Action dated Jan. 30, 2014 for CN Application No. 200980134600.4.

* cited by examiner

BASESTATION MEASUREMENTS

CROSS-REFERENCE TO RELATED APPLICATIONS

This application is a national stage filing under 35 U.S.C. 371 of International Application PCT/GB2009/051224, filed on Sep. 21, 2009, which claims priority from GB Application No. 0817440.1, filed Sep. 23, 2008. Each of these applications is incorporated herein by reference in its entirety and for all purposes.

This invention relates to a basestation, for use in a cellular mobile communication system, and in particular to a basestation that can make measurements in that mobile communication system and in other mobile communication systems.

WO2007/015066 discloses a cellular basestation, intended for deployment in a home or small business premises, that can form part of a cellular communications network, and can provide cellular coverage for a relatively small number of mobile users.

As described in WO2007/015066, the cellular basestation can operate in both GSM and UMTS cellular networks. That is, the cellular basestation can both transmit and receive signals at the frequencies, and in the formats, used by both the GSM and UMTS systems. Specifically, the basestation must be able to transmit signals at the relevant GSM and UMTS downlink frequencies, and must be able to receive signals at the relevant GSM and UMTS uplink frequencies. These transmitted and received signals allow the mobile users to communicate with the cellular network, as in a conventional cellular basestation.

WO2007/015066 further describes that the basestation should have limited mobile station and user equipment modem functionality. That is, the basestation must also be able to receive signals at the relevant GSM and UMTS downlink frequencies. This functionality allows the basestation to recover the broadcast channels from signals transmitted from other GSM and UMTS basestations.

The measurements made by the basestation on these recovered broadcast channels allow it to survey the local RF environment, during initial installation and thereafter, in order to set and modify the configuration of the basestation.

GB-2446196A describes a basestation for a cellular communications network, and more particularly a WCDMA femtocell basestation. In order to make measurements, the basestation is able to tune its receiver to the downlink frequencies in use in the network, in order to be able to make measurements and be able to assess the surrounding radio environment of the macro layer of the network, and other femtocell basestations in the network.

These two documents therefore describe basestations that are adapted to receive signals on system downlink channels of the network, or network, in which they are active.

According to a first aspect of the present invention, there is provided a basestation that is additionally adapted to receive signals on system downlink channels of at least one additional network wherein the basestation is unable to transmit signals on system downlink channels of the additional network.

This has the advantage that the basestation can make measurements on the system downlink channels of the additional network, and can use these measurements for purposes that go beyond those that are achievable when the basestation is only able to make measurements in the network in which it is active.

For a better understanding of the present invention, and to show how it may be put into effect, reference will now be made, by way of example, to the accompanying drawings, in which:—

Figure 1:
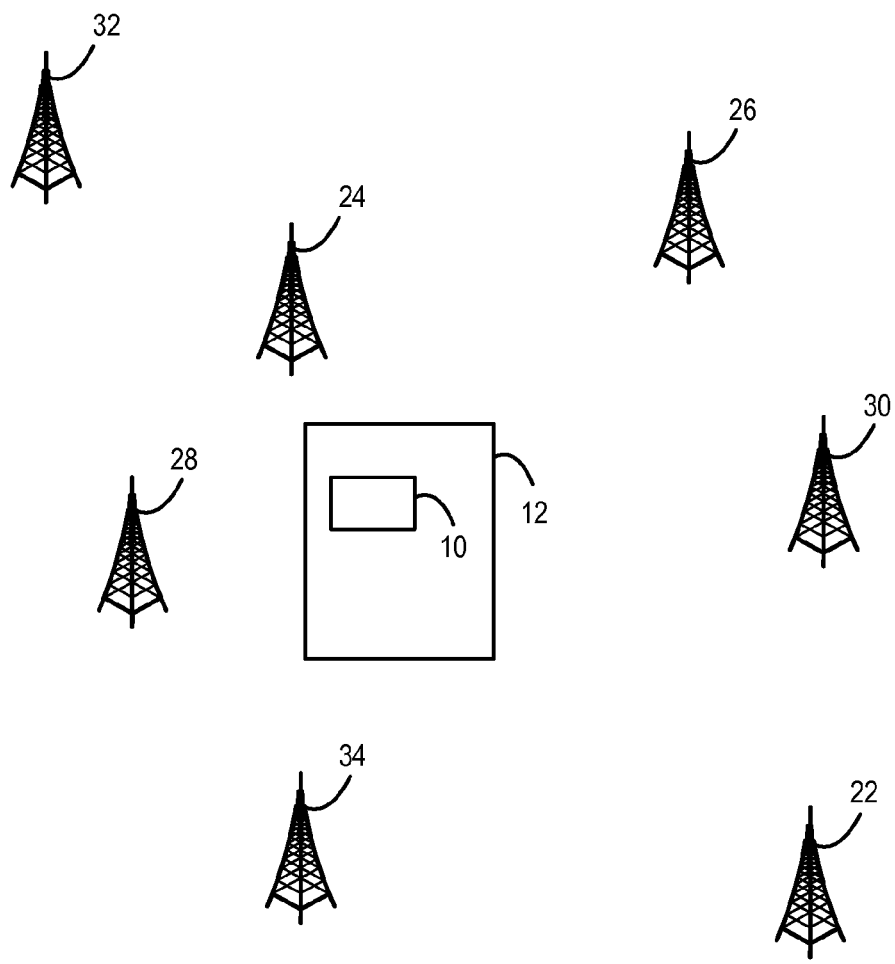
FIG. 1 is a schematic illustration of the environment of a basestation in accordance with the present invention.

FIG. 1 shows a cellular basestation 10, located within a home or small business premises 12. As is understood, the basestation 10 is a femtocell basestation. That is, it provides a cellular telecommunications service for a limited number of mobile devices or user equipments within its relatively small coverage area. For example, the operating parameters of the basestation 10 may be set so that the coverage area includes the premises 12 in which it is located, but hardly extends outside those premises. In addition, the basestation 10 may be programmed so that only mobile devices or user equipments that have been registered by the user can obtain cellular service through the basestation.

In some respects, the operation of the basestation 10 is similar to that of other cellular basestations, in that the basestation is able to establish communications with one or more mobile devices or user equipments over the radio interface in accordance with the relevant cellular standard, and is able to communicate with the core network of the relevant mobile network operator. In other respects, the operation of the basestation 10 as a femtocell basestation is different from that of cellular basestations in the macrocell layer. The operation of the basestation 10 will not be described in detail herein, except in so far as this is necessary for an understanding of the present invention.

Figure 2:
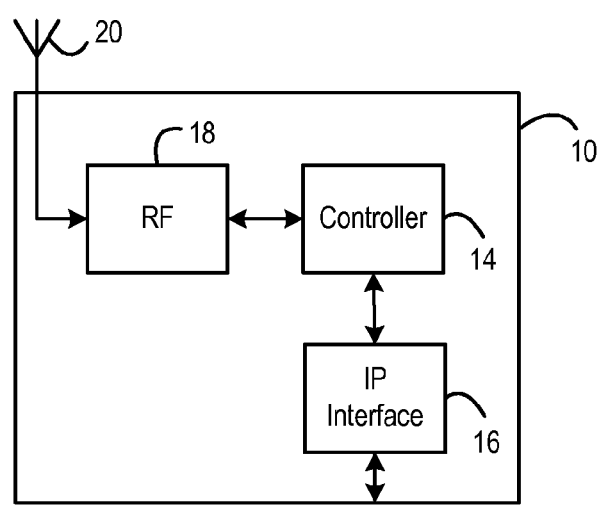
FIG. 2 is a block schematic diagram illustrating a basestation in accordance with the present invention.

FIG. 2 shows in more detail the relevant features of the basestation 10. In this example, the basestation 10 is a UMTS basestation. Specifically, the basestation 10 includes a controller 14, which communicates with an IP interface 16 and with RF circuitry 18, which is in turn connected to an antenna 20. In a simplified form, the cellular operation of the basestation 10 is such that radio frequency signals are transmitted to suitably equipped mobile devices within the coverage area at the relevant UMTS system downlink frequencies, and are received from the mobile devices within the coverage area at the relevant UMTS system uplink frequencies. The form of these signals is determined by the controller 18. Signals that need to be communicated to or from the core network of the mobile network operator are passed through the IP interface 16, and over the broadband internet connection to the premises 12.

As will be appreciated, the controller 14 is relatively complex, and makes various decisions about the operation of the basestation 10. Where relevant to an understanding of the invention, these will be described in more detail below.

FIG. 1 shows the environment in which the basestation 10 is located. This is meant to represent a typical illustrative situation in which a femtocell basestation may be deployed, rather than accurately representing any real situation.

In this example, the basestation 10 is a UMTS basestation, as described above, and is managed by a first mobile network operator. FIG. 1 shows various other cellular basestations in the vicinity of the basestation 10, such as a UMTS macrocell basestation 22 managed by the first mobile network operator;

a GSM basestation 24 managed by the first mobile network operator; UMTS macrocell basestations 26, 28 managed by a second mobile network operator; a GSM basestation 30 managed by the second mobile network operator; and UMTS macrocell basestations 32, 34 managed by a third mobile network operator.

As mentioned above, the cellular operation of the basestation 10 is such that radio frequency signals are transmitted to mobile devices within the coverage area at the relevant UMTS system downlink frequencies, and are received from the mobile devices within the coverage area at the relevant UMTS system uplink frequencies. In order to achieve this, the controller 14 ensures that the relevant circuits in the RF circuitry 18 are tuned so that they generate and detect signals at the correct frequencies.

One important aspect of the operation of a femtocell basestation, such as the basestation 10, is that it should be self-installing and self-configuring, at least to some degree. One way in which the relevant information can be obtained in order to allow this is for the basestation 10 to be able to detect signals transmitted by other nearby basestations. In order to achieve this, the controller 14 is adapted to ensure that the relevant circuits in the RF circuitry 18 are tuned so that they detect signals at the correct frequencies. In particular, the controller 14 is adapted to ensure that the relevant circuits in the RF circuitry 18 are tuned so that they detect signals at the operating frequencies of basestations in other networks.

Figure 3:
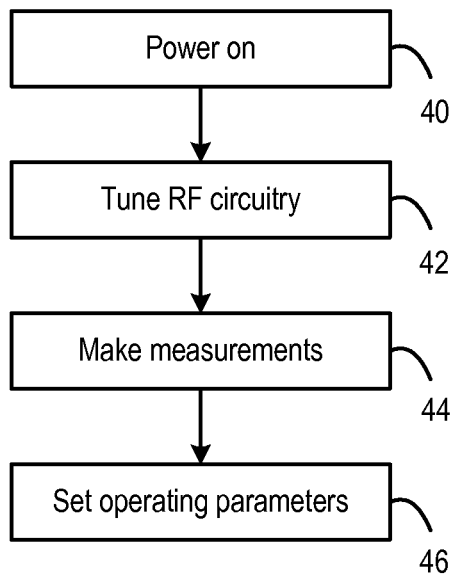
FIG. 3 is a flow chart, illustrating a first method in accordance with the present invention.

FIG. 3 is a flow chart, illustrating the operation of the basestation 10 when it is powered on. At step 40, the power is switched on. At step 42, the RF circuitry 18 of the basestation 10 is tuned to the relevant downlink frequencies of selected surrounding basestations, at step 44, the basestation 10 makes measurements of various parameters and, at step 46, the controller 14 sets various parameters of the basestation 10 for its own use. As is known, the basestation 10 can detect signals transmitted by other basestations in the same network, that is, in the example illustrated in FIG. 1, the basestation 10 can detect signals transmitted by the UMTS macrocell basestation 22 that is also managed by the first mobile network operator.

The measurements made, and the information read from such signals, allows the basestation 10, for example, to construct a list of neighbouring UMTS basestations that can be used when considering cell location updates or handover, and to set its maximum transmit power so that interference with other neighbouring UMTS basestations is minimized.

When a conventional macrocell basestation is installed, it is provided by the network with information about its radio environment, and in particular is provided with a list of neighbouring cells. In the case of a conventional UMTS macrocell basestation, this list typically includes neighbouring GSM macrocell basestations, thereby enabling the possibility of a handover from the UMTS basestation to a neighbouring GSM basestation.

However, that is not possible in the case of a femtocell basestation, because the network operator will not know in advance exactly where the basestation will be deployed, and therefore will not be able to provide the basestation with relevant information about its neighbouring basestations.

Figure 4:
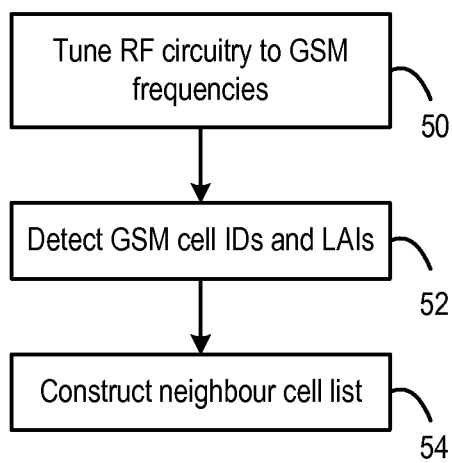
FIG. 4 is a flow chart, illustrating a second method in accordance with the present invention.

FIG. 4 is therefore a flow chart, illustrating a process performed by the basestation 10 in order to obtain the relevant information.

Specifically, at step 50, the RF circuitry 18 of the basestation 10 is tuned to the relevant GSM downlink frequencies, that is the downlink frequencies used by GSM basestations managed by the first mobile network operator, such as the basestation 24 in the illustrative network of FIG. 1. At step 52, the basestation 10 attempts to detect the cell IDs and Location Area Identifiers (LAIs) broadcast by neighbouring GSM basestations. At step 54, the basestation 10 constructs a list of neighbouring GSM cells that can be used as the basis for future handovers.

In forming the list of neighbouring GSM cells, there is first formed a list of all potential surrounding GSM macrocells, by merging all neighbour cells lists from all received WCDMA and GSM macrocells. Then this list is filtered to include the only the most likely macrocells for cell reselection and handover.

The list can be filtered on the basis of any desired criteria. However, in one embodiment of the invention, a higher weight can be given to a GSM macrocell if the femtocell basestation 10 has successfully synchronised to the macrocell and read its System Information. Further, each GSM macrocell can be given a weight depending on the number of times that that macrocell is referenced in the neighbour cell lists of other macrocells. Specifically, a higher reference count can be associated with a higher weight.

The actual GSM measurements that can be made depend on the cell synchronisation status. If the cell is unsynchronised, then only the carrier RSSI is known. However, if the cell is synchronised, then it is possible to obtain the BSIC, a frequency error estimate, the SNR and cell timing information. If the cell System Information can be decoded then the LAC, the RAC, the Cell ID, the PLMN ID and the WCDMA/GSM neighbour cells of the cell are available, amongst other information.

After installation, it is useful for the basestation 10 to be able to obtain information from other nearby basestations, and this information can be used for a variety of purposes, for example relating to the operating parameters of the basestation, relating to the internal operation of the basestation, or relating to the management of the cellular network by the network operator.

Figure 5:
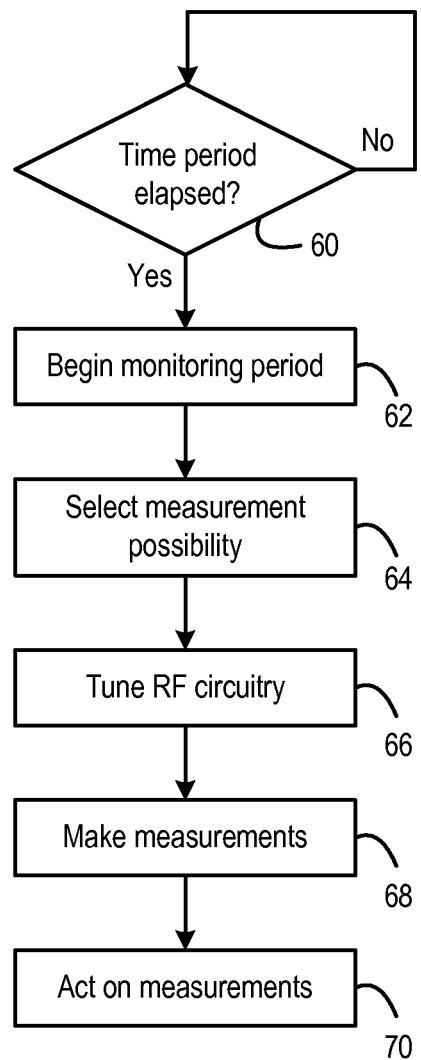
FIG. 5 is a flow chart, illustrating a third method in accordance with the present invention.

FIG. 5 is a flow chart, illustrating the process for making measurements during operation of the basestation 10.

At step 60, it is determined whether a specified time period has elapsed since the previous monitoring episode. This specified time period is dynamically configurable, but may typically be of the order of 100 seconds. The time period can be configured by the management system or can be adaptive. For example, if the femtocell basestation 10 determines that it can detect signals from a large number of nearby basestations, it can schedule more frequent measurements.

When the specified period has elapsed, the process passes to step 62, in which a monitoring period begins. The duration of the monitoring period is also dynamically configurable but may typically be of the order of 10-60 milliseconds. The required measurement duration depends on the operation being performed, and is constrained by the standardised radio interface. For example, for a basestation that is active in a WCDMA network, there is a limit on the available time during which the basestation can be taking measurements in another network.

In step 64, one of the available measurement possibilities is selected, as will be described in more detail below.

In step 66, the RF circuitry 18 of the basestation 10 is tuned to the relevant frequency, in order to be able to detect the required signal from another one of the nearby basestations, and in step 68 the relevant measurements are made.

In step 70, after the measurements have been made, taking account of the fact that it may be necessary to accumulate measurements made during multiple monitoring periods, suitable action is taken, again as described in more detail below.

It is advantageous for a femtocell basestation to be able to detect signals from surrounding basestations, and hence to make measurements on those signals or to read information transmitted by those basestations. This ability can be used for several purposes, some of which have previously been recognized.

For example, a femtocell basestation must typically choose its operating frequencies, transmit power and channelization parameters (i.e. the Primary Scrambling Code for a WCDMA basestation, or the BSIC for a GSM basestation) in order to minimise interference.

As another example, a femtocell basestation may perform Physical Layer synchronisation, adapting its uplink and downlink timing in order to minimise interference with nearby basestations.

As another example, a basestation may be provided with an internal reference oscillator that does not necessarily meet the strict timing requirements imposed by the relevant standard, but in that situation it may be able to refine the timing provided by the internal reference oscillator based on measurements from surrounding basestations.

As a further example, a basestation may decode system parameters from surrounding basestations, when these are not available via the core network interface, in order to operate successfully as part of a network. For example, in the case of a macrocell basestation, the deployment location of the basestation will be known in advance, and so the basestation can be provisioned with the relevant information as part of the cell planning process. However, this will not be the case for a femtocell basestation, which will typically be deployed in an unplanned manner, and so it is advantageous for the femtocell basestation to be able to decode the relevant parameters from the transmissions of the nearby basestations. Examples of these parameters are the Neighbouring Cell lists, Cell IDs, PLMN IDs, Location Area IDs and Routing Area IDs of the nearby basestations.

In particular, the basestation in accordance with the illustrated embodiment of the invention, although operating only in a WCDMA or UMTS network, is able to extract the Cell ID and the LAI from signals transmitted both from nearby WCDMA cells and from nearby GSM cells, in order to support femtocell initiated handover.

In addition, it has been recognized that a femtocell basestation operating in a particular network (i.e. in accordance with a particular communications standard and under the control of a particular mobile network operator) can detect signals transmitted by other nearby basestations operating in that network, and can use these to extract estimates of the frequency error of its internal frequency reference.

These signals can be detected when the femtocell basestation is powered on, and at periodic intervals thereafter, as described above.

The basestation in accordance with the illustrated embodiment of the invention operates in one particular WCDMA or UMTS network, that is, in the WCDMA network operated by one particular mobile network operator, referred to herein as the WCDMA Home PLMN (HPLMN, where the abbreviation PLMN refers to a Public Land Mobile Network, as is well known). However, this basestation is also able to monitor both GSM and WCDMA cells of the HPLMN and any alternate PLMNs (termed herein observed PLMNs, or OPLMNs).

In particular, the femtocell basestation in accordance with the illustrated embodiment of the invention is able to use the detected signals from these basestations to obtain estimates of the frequency error from its internal frequency reference, and is able to combine these frequency error estimates to obtain more reliable frequency information.

For example, if the femtocell basestation 10 is unable to detect any signals from another WCDMA basestation in the HPLMN, it can instead use the network operator's nearby GSM basestations as a frequency reference instead.

As another example, if the femtocell basestation 10 is unable to detect any signals from any other basestation in the HPLMN, then an OPLMN (either WCDMA or GSM, or both) may be used instead.

These two examples can be combined into a preference list. For example, measurements from HPLMN WCDMA basestations are used if available, but, if not, measurements from HPLMN GSM basestations are used if they are available, but, if they are not, measurements from OPLMN WCDMA basestations are used if they in turn are available, but, if they are not, measurements from OPLMN GSM basestations are used. Such an algorithm can be used to obtain sufficient measurements for a reliable result, and can also if required be used to weight the frequency error measurements obtained.

As described above with reference to step 64 of the process shown in FIG. 5, there are periodic opportunities to perform measurements. At each of these opportunities, the basestation 10 can determine which of the possible measurements should be made.

For example, the basestation can perform an operation (referred to as WCDMA IDENT) on a WCDMA HPLMN cell or a WCDMA OPLMN cell, whereby it discovers and measures all Primary Scrambling Codes on a particular WCDMA frequency. One WCDMA IDENT operation can yield multiple Scrambling Codes along with Received Signal Code Power (RSCP), Frequency Error and Cell Timing information for each, in order to refresh the stored information about that WCDMA cell for a given frequency.

As an alternative, the basestation can receive a single WCDMA System Information block for a given cell (referred to as WCDMA SI), or attempt Initial Synchronisation to a new GSM cell on a given frequency (referred to as GSM ISYNC), or update GSM cell synchronisation on a given frequency (referred to as GSM USYNC), or receive a single GSM System Information block for a given cell (referred to as GSM SI) or update an RSSI estimate on a number of GSM frequencies (referred to as GSM PWR).

The actual measurement performed during each opportunity is driven by a triage multiplex where the most needed measurement is performed on a case by case basis. This provides feature parity between GSM and WCDMA and also allows cells to be discovered, tracked and updated during normal basestation operation.

The ability to monitor signals transmitted by basestations in additional networks, whether they are networks of the same network operator or any other network operator using different cellular standards or networks of other network operators using the same cellular standard, provides additional features.

For example, a network monitoring system can be provided. If there is a dense deployment of basestations, then a network operator can make use of the measurements by collating them in some centralised entity. These collated results could be used for HPLMN macro network infill monitoring (identifying coverage holes) and observing the coverage of competing network operators for both GSM and WCDMA.

Alternatively, a location management system can be provided. Using both detected 2G and 3G PLMN IDs, a basestation can detect if has been deployed outside of its intended (national) location and can raise an alarm. This can prevent misuse of the basestation.

A similar system can be used to provide location based services to the user. By examining both detected 2G and 3G macrocell IDs, it is possible to determine a physical location of a femtocell basestation, at least to some degree of accuracy. Thus, various end-user location based services can be provided by the femtocell without the need for a GPS receiver or location determination by manual means.

There is thus provided a basestation that can adapt its operation based on a wider range of measurements taken in the radio environment.

The invention claimed is:

1. A base station for providing cellular communications service for one or more user equipments in a cellular communications network, wherein
said base station is configured to provide a cellular communications service in at least one active cellular communications network by transmitting signals on system downlink channels of the active network and by receiving signals on system uplink channels of the active network;
said base station is configured to receive signals on system downlink channels of the active network;
said base station is configured to periodically receive signals on wireless system downlink channels of at least one additional cellular communications network, wherein said base station is unable to transmit signals on wireless system downlink channels of the additional network, the additional network being different from the active network, the active network comprising one or more macrocell base stations, wherein the additional network is operated by a different cellular network operator from the active network;
said base station is configured to configure itself based in part on said signals received on wireless system downlink channels of the additional network;
said base station is configured to examine detected macro cell IDs of cells in the active network and cells in the additional network; and
said base station is configured to determine a physical location of the base station from said detected macro cell IDs.

2. A base station as claimed in claim 1, wherein the additional network operates in accordance with a different cellular standard from the active network.

3. A base station as claimed in claim 1, configured to receive signals on system downlink channels of at least one additional network when the base station is powered on.

4. A base station as claimed in claim 1, configured to receive signals on system downlink channels of at least one additional network periodically during operation of the base station.

5. A base station as claimed in claim 1, wherein the active cellular communications network is a UMTS network, and the additional network is a GSM network, such that said base station is configured to receive signals on system downlink channels of the GSM network and is unable to transmit signals on system downlink channels of the GSM network.

6. A base station as claimed in claim 5, wherein the base station is configured to detect signals on system downlink channels of the GSM network, and to construct a list of neighboring GSM cells based on the detected signals, for use in a possible handover to the GSM network.

7. A base station as claimed in claim 1, having a coverage area that extends substantially only within a premises within which it is located.

8. A base station as claimed in claim 1, having an IP interface for connection to a core network of the cellular communications network.

9. A method of operation of a base station providing cellular communications service for one or more user equipments in a cellular communications network, wherein
said base station is configured to provide a cellular communications service in at least one active cellular communications network by transmitting signals on system downlink channels of the active network and by receiving signals on system uplink channels of the active network; and
said base station is configured to receive signals on system downlink channels of the active network;
the method comprising
periodically receiving signals on wireless system downlink channels of at least one additional cellular communications network, wherein said base station is unable to transmit signals on wireless system downlink channels of the additional network, the additional network being different from the active network, the network comprising one or more macrocell basestations, wherein the additional network is operated by a different cellular network operator from the active network;
configuring the base station based in part on said signals received on wireless system downlink channels of the additional network;
examining detected macro cell IDs of cells in the active network and cells in the additional network; and
determining a physical location of the base station from said detected macro cell IDs.

10. A method as claimed in claim 9, wherein the additional network operates in accordance with a different cellular standard from the active network.

11. A method as claimed in claim 9, comprising receiving signals on system downlink channels of at least one additional network when the base station is powered on.

12. A method as claimed in claim 9, comprising receiving signals on system downlink channels of at least one additional network periodically during operation of the base station.

13. A method as claimed in claim 9, wherein the active network of the base station is a WCDMA network of a first network operator, the method comprising receiving signals on system downlink channels of at least one additional network, wherein the additional network is:
a GSM network of the first network operator;
a WCDMA network of a second network operator; or
a GSM network of the second network operator.

14. A method as claimed in claim 9, comprising defining measurement opportunities during operation of the base station and, at each measurement opportunity, selecting a required measurement to be made.

15. A method as claimed in claim 9, wherein the active network of the base station is a WCDMA network of a first network operator, the method comprising receiving signals on system downlink channels of at least one additional network, wherein the additional network is a GSM network of the first network operator;
the method further comprising:
constructing a list of neighboring GSM cells based on the detected signals, for use in a possible handover to the GSM network.

16. A method as claimed in claim 15, wherein the step of constructing a list of neighboring GSM cells comprises:
constructing a list of potential surrounding GSM macro cells based on neighbor cells lists from receiving WCDMA and GSM macro cells; and filtering the list of potential surrounding GSM macro cells to include only the most likely macro cells for cell reselection and handover.

17. A method as claimed in claim 16, wherein the step of filtering the list of potential surrounding GSM macro cells comprises:

giving preference to a GSM macro cell if the base station has successfully synchronized to the macro cell and read its System Information.

18. A method as claimed in claim 16 or 17, wherein the step of filtering the list of potential surrounding GSM macro cells comprises:

giving a weight to each GSM macro cell depending on the number of times that that macro cell is referenced in neighbor cell lists of other macro cells.

19. A method as claimed in claim 9, further comprising:

by detecting signals on the system downlink channels of the active network and on system downlink channels of the at least one additional network, determining if the base station has been deployed outside of its intended location.

20. A base station for providing cellular communications service for one or more user equipments in a cellular communications network, wherein said base station is configured to provide a cellular communications service in at least one active cellular communications network by transmitting signals on system downlink channels of the active network and by receiving signals on system uplink channels of the active network;

said base station is configured to receive signals on system downlink channels of the active network;

said base station is configured to periodically receive signals on wireless system downlink channels of at least one additional cellular communications network, wherein said base station is unable to transmit signals on wireless system downlink channels of the additional network, the additional network being different from the active network, the additional network comprising one or more macrocell basestations, wherein the additional network is one of: a GSM network, a UMTS network, and a WCDMA network;

said base station is configured to configure itself based in part on said signals received on wireless system downlink channels of the additional network;

said base station is configured to examine detected macro cell IDs of cells in the active network and cells in the additional network; and said base station is configured to determine a physical location of the base station from said detected macro cell IDs.

\* \* \* \* \*